(12) United States Patent
Lyu et al.

(10) Patent No.: US 8,736,686 B2
(45) Date of Patent: May 27, 2014

(54) METHOD FOR JUDGING WHETHER LENS AND SENSING ELEMENT OF IMAGE PICKUP DEVICE ARE PARALLEL

(75) Inventors: Szu-Hao Lyu, Taipei (TW); Chien-Nan Yu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 518 days.

(21) Appl. No.: 13/193,307

(22) Filed: Jul. 28, 2011

(65) Prior Publication Data

US 2012/0300199 A1    Nov. 29, 2012

(30) Foreign Application Priority Data

May 27, 2011    (TW) .............................. 100118600 A

(51) Int. Cl.
*H04N 17/00* (2006.01)
*H04N 17/02* (2006.01)

(52) U.S. Cl.
USPC .......................................... 348/188; 348/187

(58) Field of Classification Search
CPC ..... H04N 17/002; H04N 17/00; H04N 17/02; G06T 7/0018

USPC ........... 348/188, 187, 180, 175, 176; 702/116
IPC ............................................ H04N 17/00,17/02
See application file for complete search history.

(56) References Cited

U.S. PATENT DOCUMENTS

| 6,545,775 | B1 * | 4/2003 | Watanabe et al. .............. 358/442 |
| 2009/0061971 | A1 * | 3/2009 | Weitzner et al. .................. 463/2 |
| 2009/0273679 | A1 * | 11/2009 | Gere et al. ..................... 348/187 |

* cited by examiner

*Primary Examiner* — Sherrie Hsia
(74) *Attorney, Agent, or Firm* — Kirton McConkie; Evan R. Witt

(57) ABSTRACT

An optical analysis method is provided for judging whether a lens and a sensing element of an image pickup device are parallel with each other. The method utilizes a tested image pickup device and a standard image pickup device to shoot an object at the same fixed shooting position to acquire a standard image frame and a tested image frame. According to the difference between the position coordinate value or the area of at least one mark of the standard image frame and the tested image frame, the method can judge whether the tested lens and the tested sensing element of the tested image pickup device are parallel with each other.

12 Claims, 8 Drawing Sheets

| First error value set | Second error value set | Tilt angle |
|---|---|---|
| $E_{p5}, E_{p6}, E_{p7}, E_{p8}$ | $E_{a5}, E_{a6}, E_{a7}, E_{a8}$ | $\theta_1$ |
| ⋮ | ⋮ | ⋮ |
| $E_{p1}, E_{p2}, E_{p3}, E_{p4}$ | $E_{a1}, E_{a2}, E_{a3}, E_{a4}$ | $\theta_n$ |
| ⋮ | ⋮ | ⋮ |
| $E_{p9}, E_{p10}, E_{p11}, E_{p12}$ | $E_{a9}, E_{a10}, E_{a11}, E_{a12}$ | $\theta_{n+m}$ |
| ⋮ | ⋮ | ⋮ |

FIG.9

METHOD FOR JUDGING WHETHER LENS AND SENSING ELEMENT OF IMAGE PICKUP DEVICE ARE PARALLEL

FIELD OF THE INVENTION

The present invention relates to an optical analysis method, and more particularly to an optical analysis method for judging whether a lens and a sensing element of an image pickup device are parallel with each other.

BACKGROUND OF THE INVENTION

With increasing development of science and technology, the applications of various electronic devices become more and more diversified. As known, the performance of the electronic device used by the consumer is highly dependent on whether the quality control specification in the production line of electronic device is strict or not. For example, in the production line of an image pickup device such as a web camera or a camera, the installation and setting of the lens thereof affect the image quality of the image pickup device.

FIG. 1 schematically illustrates a portion of a conventional image pickup device. As shown in FIG. 1, the image pickup device 1 comprises a lens 11 and a sensing element 12. For example, the sensing element 12 is a charge-coupled device (CCD). The image frame captured by the lens 11 can be imaged on the sensing element 12. Consequently, during the process of assembling the lens 11, the lens 11 needs to be parallel with the sensing element 12 as possible as it can. In such way, the image frame outputted from the sensing element 12 is not distorted, or the image frame is not partially shape or partially blurred.

Conventionally, in the production line of the image pickup device 1, the focus of the lens 11 is adjusted before the lens 11 is assembled. For assuring that the lens 11 of the assembled image pickup device 1 is parallel with the sensing element 12, an image pickup operation is performed to shoot an object 8, and thus an image frame 9 is obtained (see FIG. 2). The object 8 is usually a planar picture, which is placed on a jig tool (not shown) of a production line. The planar picture is adjusted to be parallel with the sensing element 12 of the image pickup device 1.

Please refer to FIG. 2, which is a schematic view illustrating an image frame captured by the conventional image pickup device. The image frame 9 captured by the image pickup device 1 will be outputted to an electronic computing device such as a computer. By an application program executed in the electronic computing device, the image frame 9 is divided into a plurality of sub-image blocks 91~99. Moreover, by the application program, the resolution values of these sub-image blocks 91~99 are analyzed, and each of the resolution values is compared with a preset threshold value. In a case that the resolution value of any of the sub-image blocks is lower than the preset threshold value, it means that the lens 11 of the image pickup device 1 is not parallel with the sensing element 12 and the sub-image block is blurred. Under this circumstance, it is necessary to re-install the lens 11 of the image pickup device 1 until the resolution values of these sub-image blocks 91~99 are all higher than the preset threshold value.

Moreover, the resolution values of these sub-image blocks 91~99 are calculated on the basis of a modulation transfer function (MTF), and the resolution values can be referred as MTF values. As the MTF value is increased, the black and white contrast is increased, and thus the image is sharper. Whereas, as the MTF value is decreased, the black and white contrast is decreased, and thus the image is more blurred. That is, if the MTF values of the sub-image blocks 91~99 are all higher than the preset threshold value, it means that the whole image frame 9 is sharp and qualified. Under this circumstance, it is determined that the lens 11 and the sensing element 12 of the assembled image pickup device 1 are parallel with each other.

Nowadays, since the imaging technology of the image pickup device 1 is increasingly developed, the lens 11 of the commercially available image pickup device 1 has enhanced resolution. Due to the good resolution of the image pickup device 1, regardless of whether the lens 11 and the sensing element 12 of the image pickup device 1 are parallel with each other or not, the resolution values of all of the sub-image blocks 91~99 of the image frame 9 are significantly distinguished. In other words, the accuracy of judging whether the lens 11 and the sensing element 12 of the image pickup device 1 are parallel with each other in the production line will be impaired. Therefore, there is a need of providing an improved method for judging whether the lens 11 and the sensing element 12 of the image pickup device 1 are parallel with each other.

SUMMARY OF THE INVENTION

The present invention provides an optical analysis method for judging whether a lens and a sensing element of an image pickup device are parallel with each other, in which the judging result is irrelevant to the resolution of the lens.

In accordance with an aspect of the present invention, there is provided a method for judging whether a lens and a sensing element of an image pickup device are parallel with each other. The method includes the following step. In a step (a), an object having at least one mark is fixed. In a step (b), a standard image pickup device is placed at a shooting position, and the object is shot by the standard image pickup device to acquire a standard image frame. The standard image pickup device includes a standard lens and a standard sensing element. The standard lens and the standard sensing element are parallel with each other. In a step (c), at least one standard parameter of the at least one mark of the standard image frame is acquired. In a step (d), a tested image pickup device is placed at the shooting position, and the object is shot by the tested image pickup device to acquire a tested image frame. The tested image pickup device includes a tested lens and a tested sensing element. In a step (e), at least one tested parameter of the at least one mark of the tested image frame is acquired. In a step (f), the at least one standard parameter is compared with the at least one tested parameter, thereby judging whether the tested lens and the testing sensing element of the tested image pickup device are parallel with each other.

In an embodiment, the at least one standard parameter includes a standard coordinate value, and the at least one tested parameter includes a tested coordinate value the. In addition, the step (f) includes a sub-step of acquiring an error value between the standard coordinate value and the tested coordinate value, wherein if the error value is lower than a threshold value, the tested lens and the testing sensing element of the tested image pickup device are determined to be parallel with each other.

In an embodiment, after the step (f), the method further includes a step (g) of acquiring a tilt angle of the tested lens of the tested image pickup device according to an error value look-up table, wherein the error value look-up table comprises a plurality of error values and a plurality of tilt angles corresponding to the error values.

In an embodiment, the at least one standard parameter includes a standard area, and the at least one tested parameter includes a tested area. In addition, the step (f) includes a sub-step of acquiring an error value between the standard area and the tested area, wherein if the error value is lower than a threshold value, the tested lens and the testing sensing element of the tested image pickup device are determined to be parallel with each other.

In an embodiment, the method further includes a step (g) of acquiring a tilt angle of the tested lens of the tested image pickup device according to an error value look-up table, wherein the error value look-up table includes a plurality of error values and a plurality of tilt angles corresponding to the error values.

In an embodiment, the at least one standard parameter includes a standard coordinate value and a standard area, and the at least one tested parameter includes a tested coordinate value and a tested area. In addition, the step (f) includes a sub-step of acquiring a first error value between the standard coordinate value and the tested coordinate value and a second error value between the standard area and the tested area, wherein if the first error value is lower than a first threshold value and the second error value is lower than a second threshold value, the tested lens and the testing sensing element of the tested image pickup device are determined to be parallel with each other.

In an embodiment, after the step (f), the method further includes a step (g) of acquiring a tilt angle of the tested lens of the tested image pickup device according to an error value look-up table, wherein the error value look-up table includes a plurality of first error values, a plurality of second error values and a plurality of tilt angles corresponding to the first error values and the second error values.

In an embodiment, the standard image pickup device and the tested image pickup device are connected with an electronic computing device, and the steps (c), (e) and (f) are executed by the electronic computing device.

In an embodiment, the method is implemented in a production line of the tested image pickup device.

In an embodiment, the method is implemented after a lens-focusing step in the production line is performed.

In an embodiment, the at least mark is a cruciform mark, a square mark, a circular mark or a triangular mark.

In an embodiment, the at least one mark of the standard image frame is located around the standard image frame.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 9 schematically illustrates an error value look-up table according to an embodiment of the present invention;

DETAILED DESCRIPTION OF THE PREFERRED EMBODIMENT

The present invention provides an optical analysis method for assuring that a lens (referred hereinafter as a tested lens) and a sensing element (referred hereinafter as a tested sensing element) of an assembled image pickup device (referred hereinafter as a tested image pickup device) are parallel with each other in the production line. In such way, the image frame captured by the image pickup device is not distorted, or the image frame is not partially shape or partially blurred. The optical analysis method of the present invention is capable of judging whether the lens and the sensing element of the image pickup device are parallel with each other in the production line. Preferably, the optical analysis method of the present invention is implemented after a lens-focusing step is performed. The lens-focusing step in the production line is known in the art, and is not redundantly described herein.

Figure 1:
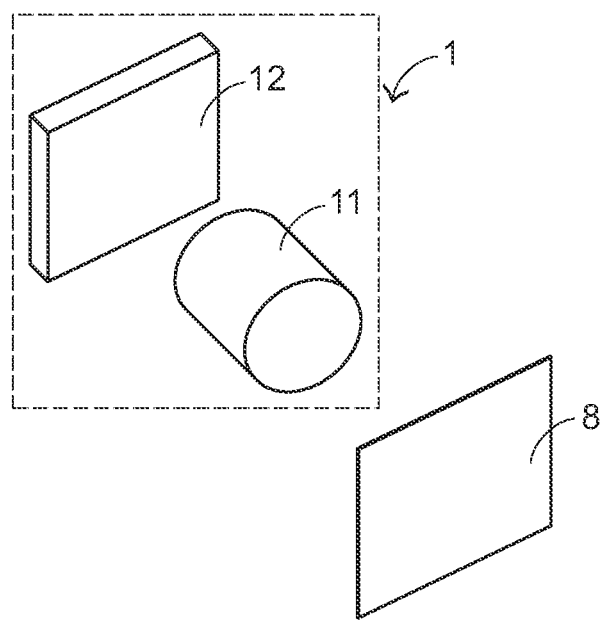
FIG. 1 schematically illustrates a portion of a conventional image pickup device.
Figure 2:
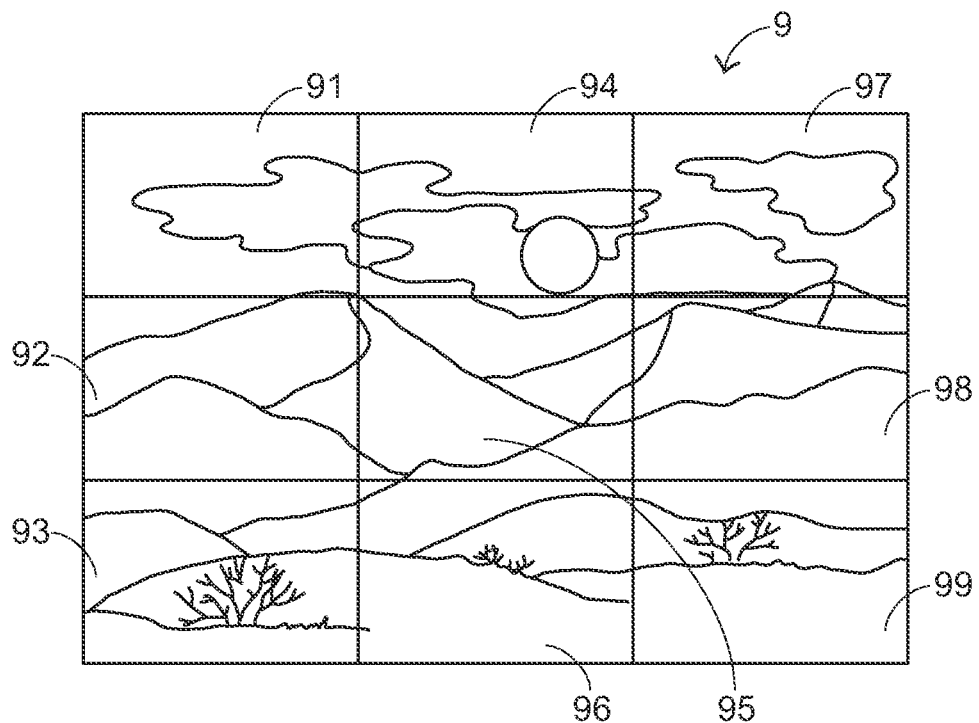
FIG. 2 is a schematic view illustrating an image frame captured by the conventional image pickup device.
Figure 3:
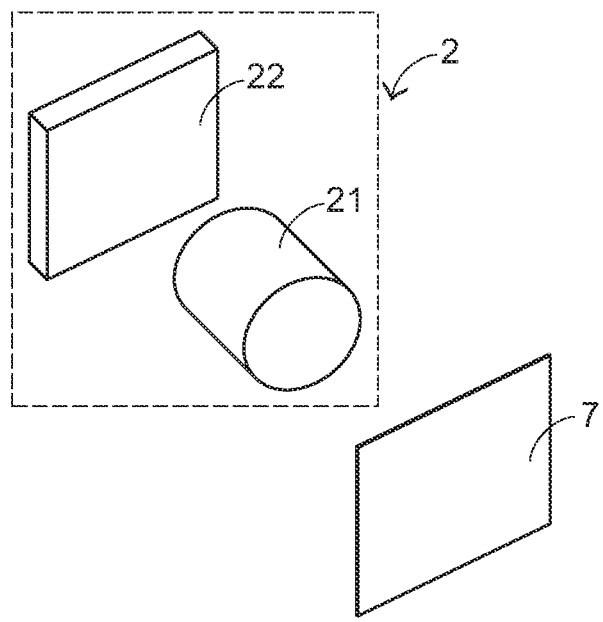
FIG. 3 schematically illustrates a portion of a standard image pickup device according to an embodiment of the present invention.
Figure 4:
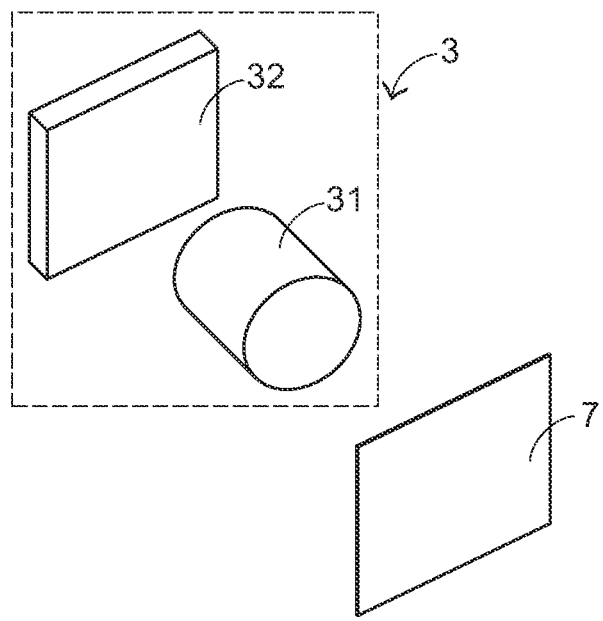
FIG. 4 schematically illustrates a portion of a tested image pickup device according to an embodiment of the present invention.
Figure 5:
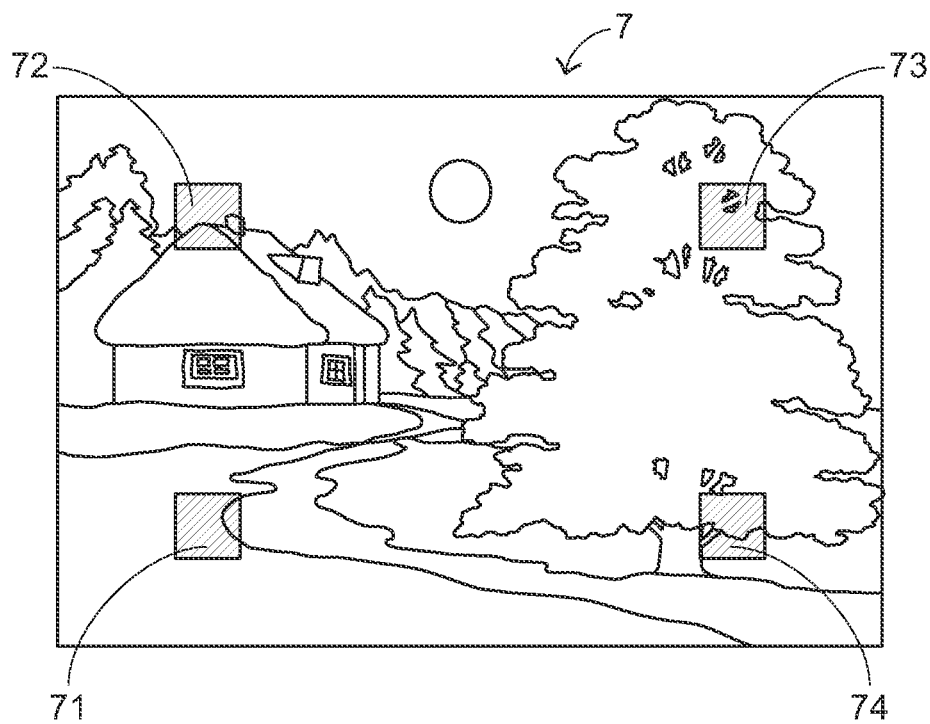
FIG. 5 schematically illustrates the appearance of an object according to an embodiment of the present invention.

For implementing the method of the present invention, a standard image pickup device and an object should be provided in advance. Please refer to FIGS. 3, 4 and 5. FIG. 3 schematically illustrates a portion of a standard image pickup device according to an embodiment of the present invention. FIG. 4 schematically illustrates a portion of a tested image pickup device according to an embodiment of the present invention. FIG. 5 schematically illustrates the appearance of an object according to an embodiment of the present invention.

The standard image pickup device 2 comprises a standard lens 21 and a standard sensing element 22. An example of the standard sensing element 22 is a charge-coupled device (CCD). The image frame captured by the standard lens 21 can be imaged on the standard sensing element 22. Since the standard lens 21 is parallel with the standard sensing element 22, the whole image frame captured by the standard image pickup device 2 is sharp.

The object 7 shown in FIG. 5 is a planar picture. Moreover, four square marks 71~74 are located on the planar picture and in the vicinity of the corners of the planar picture. It is noted that the number, location and shape of the marks may be varied according to the practical requirements. For example, the marks 71~74 can be cruciform marks, circular marks or triangular marks.

The configurations of the tested image pickup device 3 are substantially identical to those of the standard image pickup device 2. Moreover, the configurations of the tested lens 31 and the tested sensing element 32 of the tested image pickup device 3 are substantially identical to the standard lens 21 and the standard sensing element 22, respectively. The standard lens 21 and the standard sensing element 22 of the standard image pickup device 2 are parallel with each other. However, if the tested lens 31 of the tested image pickup device 3 is not precisely assembled, the tested lens 31 and the tested sensing element 32 are possibly non-parallel.

Figure 6:
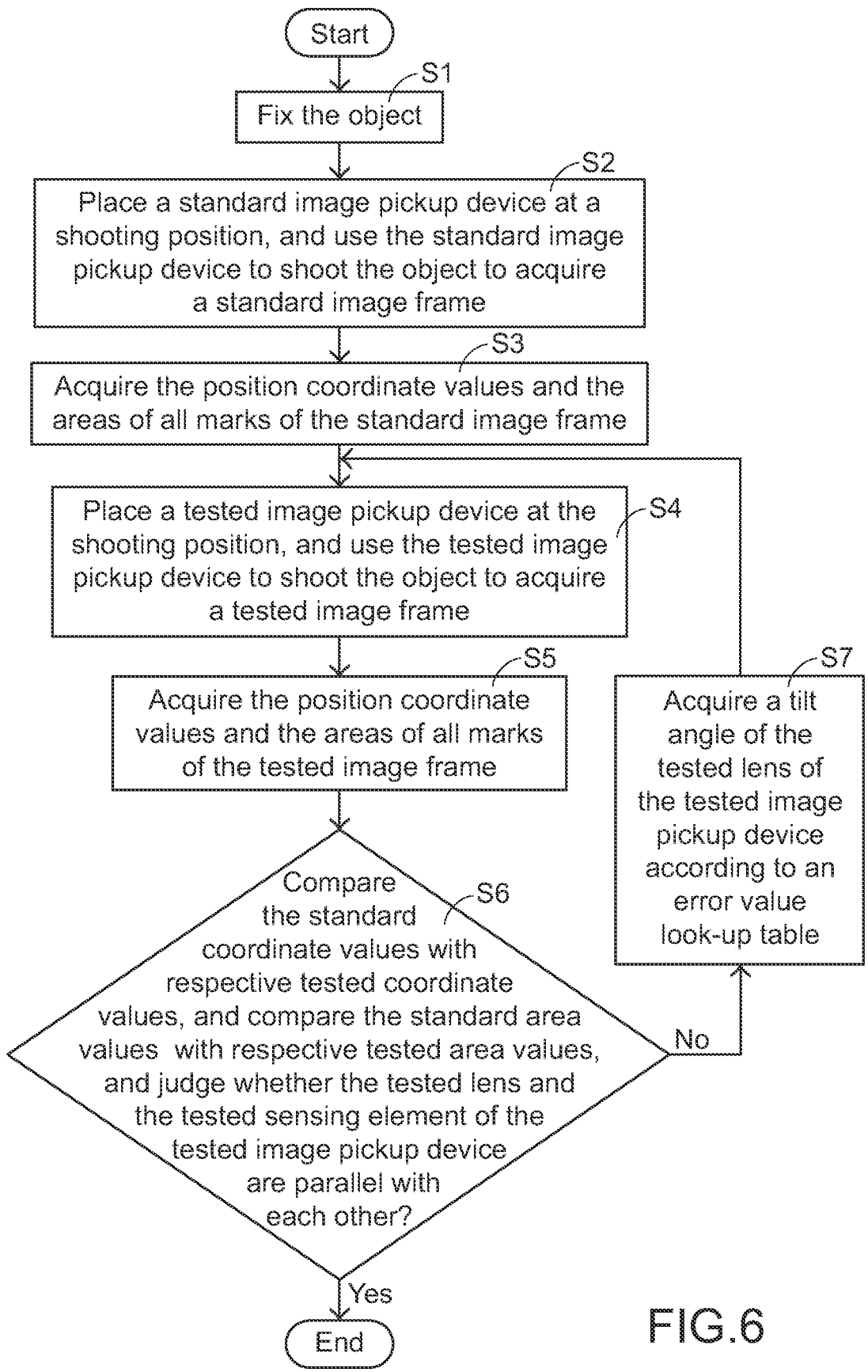
FIG. 6 is a flowchart illustrating a method for judging whether a tested lens and a tested sensing element of a tested image pickup device are parallel with each other according to a first embodiment of the present invention.

Hereinafter, the operating principles of the method of the present invention will be illustrated with reference to FIG. 6. FIG. 6 is a flowchart illustrating a method for judging whether a tested lens and a tested sensing element of a tested image pickup device are parallel with each other according to a first embodiment of the present invention.

In the step S1, the object 7 is fixed. In this embodiment, the object 7 is clamped by a jig tool (not shown) in a production line, so that the object 7 is fixed at a specified location.

Figure 7:
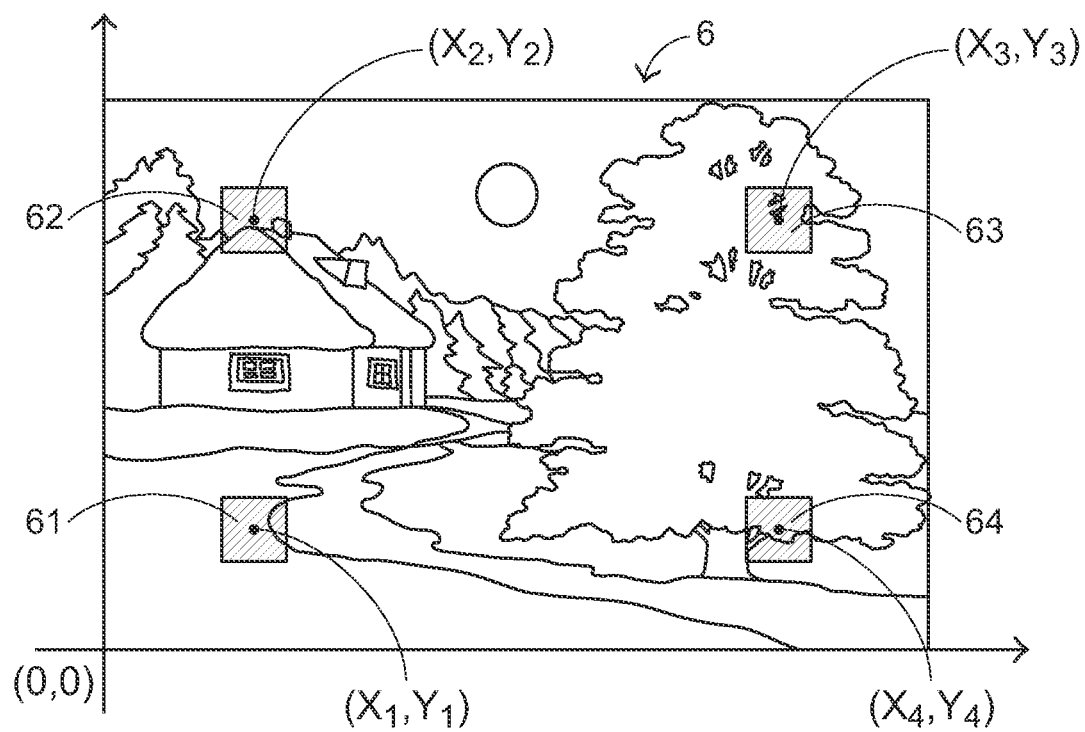
FIG. 7 schematically illustrates a standard image frame according to an embodiment of the present invention.

In the step S2, the standard image pickup device 2 is placed at a shooting position, and the object 7 is shot by the standard image pickup device 2, so that a standard image frame 6 is acquired (see FIG. 7).

In the step S3, the position coordinate values and the areas of all marks 61~64 of the standard image frame 6 are acquired, and referred hereinafter as standard coordinate values and standard areas, respectively. FIG. 7 schematically illustrates a standard image frame according to an embodiment of the present invention. The standard coordinate values of the four square marks 61~64 of the standard image frame 6 are $(X_1, Y_1)$, $(X_2, Y_2)$, $(X_3, Y_3)$ and $(X_4, Y_4)$, respectively. In addition, the standard areas of the four square marks 61~64 are all A.

Figure 8:
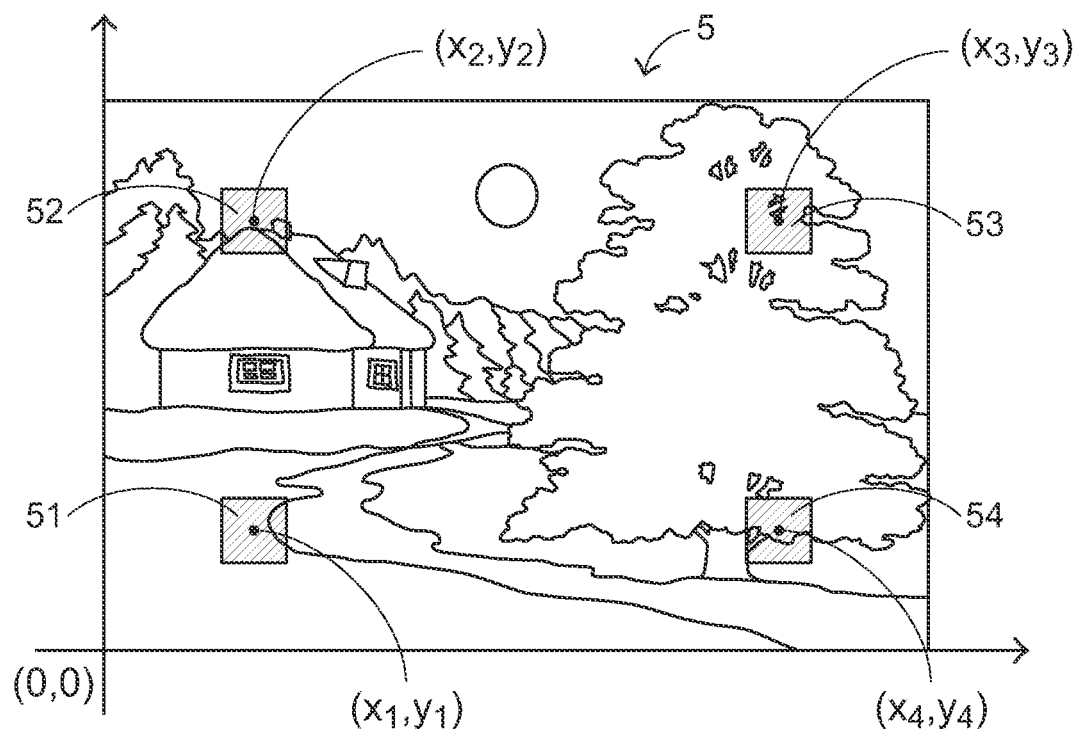
FIG. 8 schematically illustrates a tested image frame according to an embodiment of the present invention.

In the step S4, the tested image pickup device 3 is placed at the shooting position which is the same as the shooting position of the standard image pickup device 2 in the step S2, and the object 7 is shot by the tested image pickup device 3, so that a tested image frame 5 is acquired (see FIG. 8).

In the step S5, the position coordinate values and the areas of all marks 51~54 of the tested image frame 5 are acquired, and referred hereinafter as tested coordinate values and tested areas, respectively. FIG. 8 schematically illustrates a tested image frame according to an embodiment of the present invention. The tested coordinate values of all marks 51~54 of the tested image frame 5 are $(x_1, y_1)$, $(x_2, y_2)$, $(x_3, y_3)$ and $(x_4, y_4)$, respectively. In addition, the tested areas of these square marks 51, 52, 53 and 54 are $a_1$, $a_2$, $a_3$ and $a_4$, respectively.

In the step S6, the standard coordinate values of all marks 61~64 of the standard image frame 6 are compared with respective tested coordinate values of all marks 51~54 of the tested image frame 5, and the standard areas of the square marks 61~64 of the standard image frame 6 are compared with respective tested areas of the four square marks 51~54 of the tested image frame 5. These comparing results are employed to judge whether the tested lens 31 and the tested sensing element 32 of the tested image pickup device 3 are parallel with each other.

After the above steps are performed, the error values (referred hereinafter as first error values) between the standard coordinate values of the square marks 61~64 of the standard image frame 6 and the tested coordinate values of the four square marks 51~54 of the tested image frame 5 are denoted as $E_{p1}$, $E_{p2}$, $E_{p3}$ and $E_{p4}$, respectively. These first error values are calculated by the following formulae:

$$E_{p1} = \sqrt{(x_1 - X_1)^2 + (y_1 - Y_1)^2};$$

$$E_{p2} = \sqrt{(x_2 - X_2)^2 + (y_2 - Y_2)^2};$$

$$E_{p3} = \sqrt{(x_3 - X_3)^2 + (y_3 - Y_3)^2}; \text{ and}$$

$$E_{p4} = \sqrt{(x_4 - X_4)^2 + (y_4 - Y_4)^2}.$$

It is noted that the definitions of the first error values are not restricted to the above formulae. In other words, the definitions of the first error values may be altered according to the practical requirements.

Moreover, the error values (referred hereinafter as second error values) between the standard areas of the square marks 61~64 of the standard image frame 6 and the tested areas of the four square marks 51~54 of the tested image frame 5 are denoted as $E_{a1}$, $E_{a2}$, $E_{a3}$ and $E_{a4}$, respectively. These second error values are calculated by the following formulae:

$$E_{a1} = |a_1 - A_1|;$$

$$E_{a2} = |a_2 - A_2|;$$

$$E_{a3} = |a_3 - A_3|; \text{ and}$$

$$E_{a4} = |a_4 - A_4|.$$

It is noted that the definitions of the second error values are not restricted to the above formulae. In other words, the definitions of the second error values may be altered according to the practical requirements.

Moreover, if the first error values $E_{p1}$, $E_{p2}$, $E_{p3}$ and $E_{p4}$ are all lower than a first threshold value (i.e. a preset allowable error) and the second error values $E_{a1}$, $E_{a2}$, $E_{a3}$ and $E_{a4}$ are all lower than a second threshold value (i.e. a preset allowable error), it is determined that the tested lens 31 and the tested sensing element 32 of the tested image pickup device 3 are parallel with each other. On the other hand, if any of the first error values $E_{p1}$, $E_{p2}$, $E_{p3}$ and $E_{p4}$ is higher than the first threshold value or if any of the second error values $E_{a1}$, $E_{a2}$, $E_{a3}$ and $E_{a4}$ is higher than the second threshold value, it is determined that the tested lens 31 and the tested sensing element 32 of the tested image pickup device 3 are not parallel with each other. Under this circumstance, the tested image pickup device 3 should be re-assembled until the tested lens 31 and the tested sensing element 32 of the tested image pickup device 3 are parallel with each other.

Moreover, for quickly and efficiently analyzing the tilt angle of the tested lens 31 and properly adjusting the tested lens 31, an error value look-up table correlating the error values with the tilt angle of the tested lens 31 may be obtained by mathematic computation or undue experiments. FIG. 9 schematically illustrates an error value look-up table according to an embodiment of the present invention. The error value look-up table comprises a plurality of first error value sets, a plurality of second error value sets and a plurality of tilt angles of the lens corresponding to respective first error value sets and respective second error value sets.

Please refer to FIG. 6 again. In the step S7, the tilt angle of the tested lens 31 of the tested image pickup device 3 is acquired according to the error value look-up table. If any of the first error values $E_{p1}$, $E_{p2}$, $E_{p3}$ and $E_{p4}$ is higher than the first threshold value or if any of the second error values $E_{a1}$, $E_{a2}$, $E_{a3}$ and $E_{a4}$ is higher than the second threshold value, the tilt angle of the tested lens 31 of the tested image pickup device 3 is acquired by inquiring the error value look-up table. In this embodiment, by inquiring the error value look-up table, the tilt angle of the tested lens 31 of the tested image pickup device 3 is $\theta_n$.

On the other hand, if the tilt angle of the tested lens 31 fails to be directed obtained according to the error value look-up table, the tilt angle of the tested lens 31 may be acquired from the neighboring first error values $E_{p1}$, $E_{p2}$, $E_{p3}$ and $E_{p4}$ and the neighboring second error values $E_{a1}$, $E_{a2}$, $E_{a3}$ and $E_{a4}$ by interpolation.

Moreover, it is preferred that the standard image pickup device 2 and the tested image pickup device 3 are connected with an electronic computing device (not shown). The standard image frame 6 and the tested image frame 5 acquired by the standard image pickup device 2 and the tested image pickup device 3 may be transmitted to the electronic computing device. Consequently, the step S3, the step S5 and the step S6 are executed by the electronic computing device.

Figure 10:
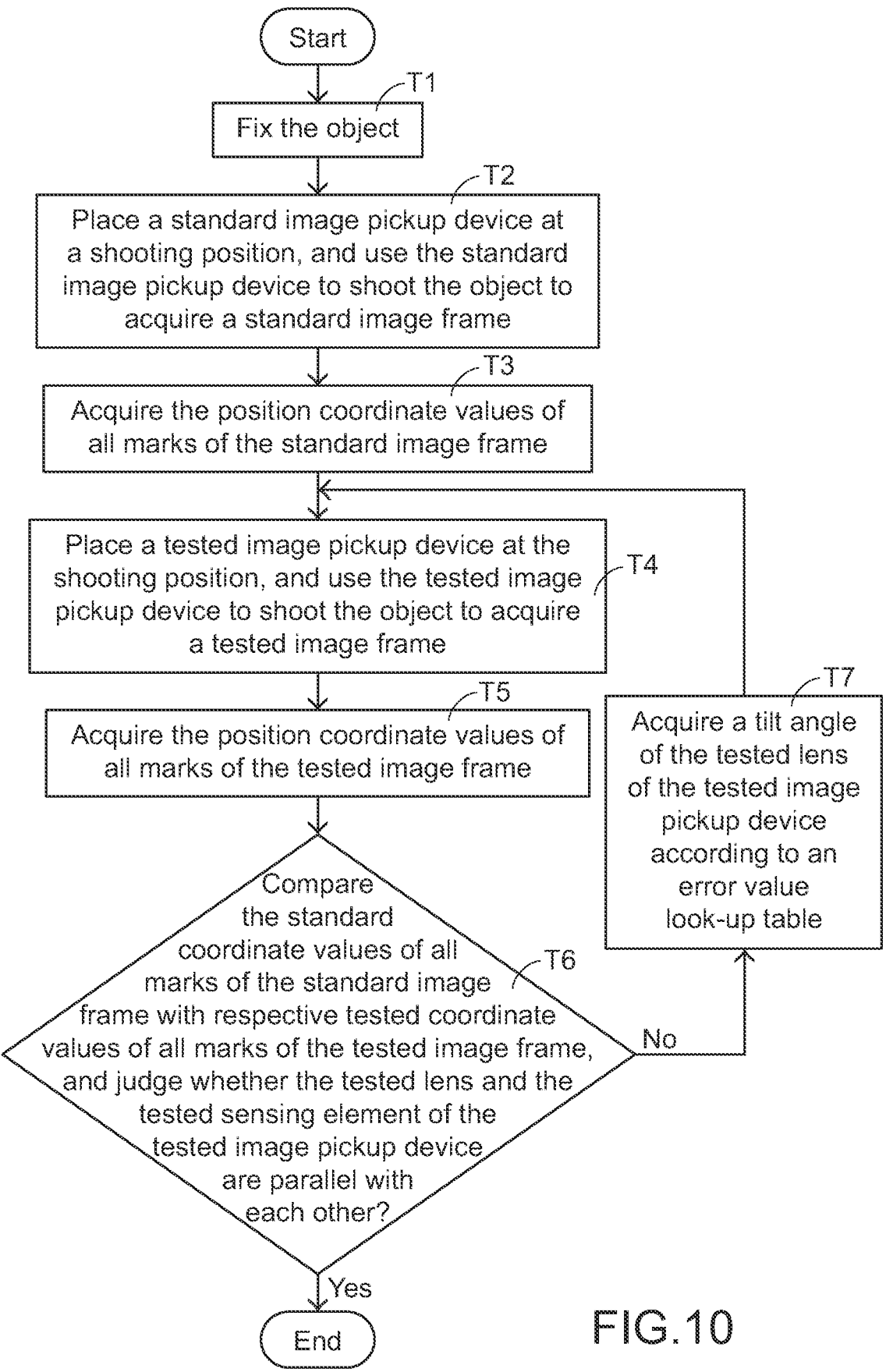
FIG. 10 is a flowchart illustrating a method for judging whether a tested lens and a tested sensing element of a tested image pickup device are parallel with each other according to a second embodiment of the present invention.

In the above embodiment, the method of the present invention is able to judge whether the tested lens and the tested sensing element of the tested image pickup device are parallel with each other according to the first error values $E_{p1}$, $E_{p2}$, $E_{p3}$ and $E_{p4}$ and the second error values $E_{a1}$, $E_{a2}$, $E_{a3}$ and $E_{a4}$. It is noted that numerous modification may be made while retaining the teachings of the invention. FIG. 10 is a flowchart illustrating a method for judging whether a tested lens and a tested sensing element of a tested image pickup device are parallel with each other according to a second embodiment of the present invention. In comparison to the first embodiment, the judging method of this embodiment can judge whether the tested lens and the tested sensing element of the tested image pickup device are parallel with each other according to only the first error values $E_{p1}$, $E_{p2}$, $E_{p3}$ and $E_{p4}$.

That is, the steps T1, T2, T4 and T7 of the second embodiment are substantially identical to the steps S1, S2, S4 and S7 of the first embodiment, respectively. Whereas, the steps S3, S5 and S6 of the first embodiment are replaced by the steps T3, T5 and T6 of the second embodiment, respectively.

In the step T3, the position coordinate values of all marks 61~64 of the standard image frame 6 are acquired, and referred as standard coordinate values.

In the step T5, the position coordinate values of all marks 51~54 of the tested image frame 5 are acquired, and referred as tested coordinate values.

In the step T6, the standard coordinate values of all marks 61~64 of the standard image frame 6 are compared with respective tested coordinate values of all marks 51~54 of the tested image frame 5. These comparing results are employed to judge whether the tested lens 31 and the tested sensing element 32 of the tested image pickup device 3 are parallel with each other.

Figure 11:
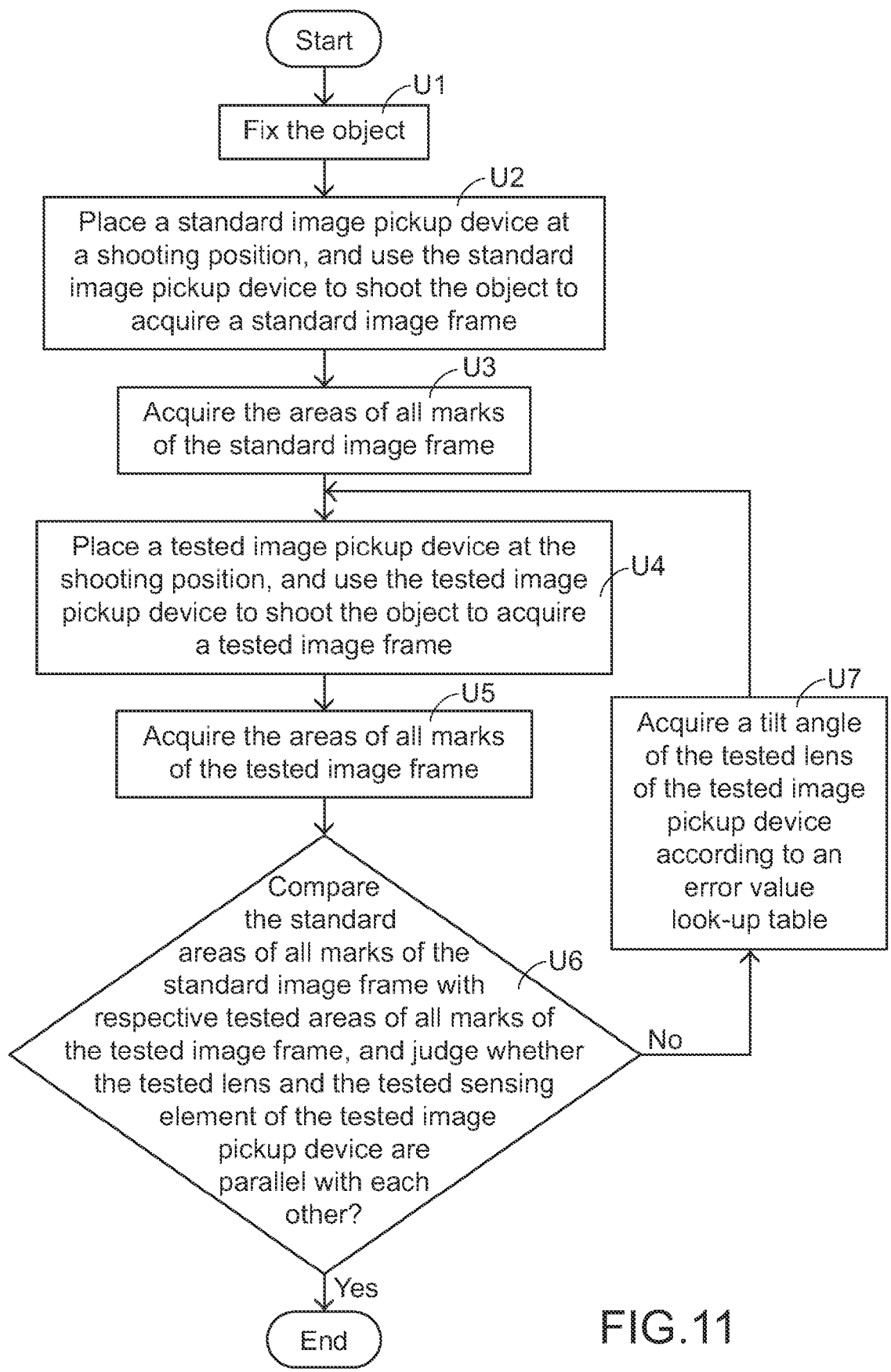
FIG. 11 is a flowchart illustrating a method for judging whether a tested lens and a tested sensing element of a tested image pickup device are parallel with each other according to a third embodiment of the present invention.

FIG. 11 is a flowchart illustrating a method for judging whether a tested lens and a tested sensing element of a tested image pickup device are parallel with each other according to a third embodiment of the present invention. In comparison to the first embodiment, the judging method of this embodiment can judge whether the tested lens and the tested sensing element of the tested image pickup device are parallel with each other according to only the second error values $E_{a1}$, $E_{a2}$, $E_{a3}$ and $E_{a4}$.

That is, the steps U1, U2, U4 and U7 of the second embodiment are substantially identical to the steps S1, S2, S4 and S7 of the first embodiment, respectively. Whereas, the steps S3, S5 and S6 of the first embodiment are replaced by the steps U3, U5 and U6 of the second embodiment, respectively.

In the step U3, the areas of all marks 61~64 of the standard image frame 6 are acquired, and referred hereinafter as standard areas.

In the step U5, the areas of all marks 51~54 of the tested image frame 5 are acquired, and referred hereinafter as tested areas.

In the step U6, the standard areas of all marks 61~64 of the standard image frame 6 are compared with respective tested areas of all marks 51~54 of the tested image frame 5. These comparing results are employed to judge whether the tested lens 31 and the tested sensing element 32 of the tested image pickup device 3 are parallel with each other.

From the above description, the method of the present invention utilizes a tested image pickup device and a standard image pickup device to shoot an object at the same shooting position to acquire a standard image frame and a tested image frame. According to the difference between the parameters (e.g. the position coordinate values and/or areas) of the marks of the standard image frame and the tested image frame, the method can judge whether the tested lens and the tested sensing element of the tested image pickup device are parallel with each other. In such way, even if the resolution of the lens of the image pickup device is very high, the possibility of causing erroneous judgment will be minimized. It is noted that the method of the present invention may be collectively operated with other optical analysis methods.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for judging whether a lens and a sensing element of an image pickup device are parallel with each other, said method comprising steps of:
    (a) fixing an object, wherein said object has at least one mark;
    (b) placing a standard image pickup device at a shooting position, and shooting said object by said standard image pickup device to acquire a standard image frame, wherein said standard image pickup device comprises a standard lens and a standard sensing element, and said standard lens and said standard sensing element are parallel with each other;
    (c) acquiring at least one standard parameter of said at least one mark of said standard image frame;
    (d) placing a tested image pickup device at said shooting position, and shooting said object by said tested image pickup device to acquire a tested image frame, wherein said tested image pickup device comprises a tested lens and a tested sensing element;
    (e) acquiring at least one tested parameter of said at least one mark of said tested image frame; and
    (f) comparing said at least one standard parameter with said at least one tested parameter, thereby judging whether said tested lens and said testing sensing element of said tested image pickup device are parallel with each other.

2. The method according to claim 1 wherein said at least one standard parameter comprises a standard coordinate value, and said at least one tested parameter comprises a tested coordinate value, and said step (f) comprises a sub-step of acquiring an error value between said standard coordinate value and said tested coordinate value, wherein if said error value is lower than a threshold value, said tested lens and said testing sensing element of said tested image pickup device are determined to be parallel with each other.

3. The method according to claim 2 wherein after said step (f), said method further comprises a step (g) of acquiring a tilt angle of said tested lens of said tested image pickup device according to an error value look-up table, wherein said error value look-up table comprises a plurality of error values and a plurality of tilt angles corresponding to said error values.

4. The method according to claim 1 wherein said at least one standard parameter comprises a standard area, and said at least one tested parameter comprises a tested area, and said step (f) comprises a sub-steps of acquiring an error value between said standard area and said tested area, wherein if said error value is lower than a threshold value, said tested lens and said testing sensing element of said tested image pickup device are determined to be parallel with each other.

5. The method according to claim 4 wherein after said step (f), said method further comprises a step (g) of acquiring a tilt angle of said tested lens of said tested image pickup device according to an error value look-up table, wherein said error value look-up table comprises a plurality of error values and a plurality of tilt angles corresponding to said error values.

6. The method according to claim 1 wherein said at least one standard parameter comprises a standard coordinate value and a standard area, and said at least one tested parameter comprises a tested coordinate value and a tested area, and said step (f) comprises a sub-step of acquiring a first error value between said standard coordinate value and said tested coordinate value and a second error value between said standard area and said tested area, wherein if said first error value is lower than a first threshold value and said second error value is lower than a second threshold value, said tested lens and said testing sensing element of said tested image pickup device are determined to be parallel with each other.

7. The method according to claim 6 wherein after said step (f), said method further comprises a step (g) of acquiring a tilt angle of said tested lens of said tested image pickup device according to an error value look-up table, wherein said error value look-up table comprises a plurality of first error values, a plurality of second error values and a plurality of tilt angles corresponding to said first error values and said second error values.

8. The method according to claim 1 wherein said standard image pickup device and said tested image pickup device are connected with an electronic computing device, and said steps (c), (e) and (f) are executed by said electronic computing device.

9. The method according to claim 1 wherein said method is implemented in a production line of said tested image pickup device.

10. The method according to claim 9 wherein said method is implemented after a lens-focusing step in said production line is performed.

11. The method according to claim 1 wherein said at least mark is a cruciform mark, a square mark, a circular mark or a triangular mark.

12. The method according to claim 1 wherein said at least one mark of said standard image frame is located around said standard image frame.

\* \* \* \* \*